(12) United States Patent
Toki et al.

(10) Patent No.: US 7,912,511 B2
(45) Date of Patent: Mar. 22, 2011

(54) ELECTRONIC DEVICE AND MICROPHONE HOLDER THEREFOR

(75) Inventors: Nozomi Toki, Tokyo (JP); Yasuhiro Sasaki, Tokyo (JP); Yasuharu Oonishi, Tokyo (JP)

(73) Assignee: NEC Corporation, Tokyo (JP)

( * ) Notice: Subject to any disclaimer, the term of this patent is extended or adjusted under 35 U.S.C. 154(b) by 557 days.

(21) Appl. No.: 11/299,912

(22) Filed: Dec. 13, 2005

(65) Prior Publication Data

US 2006/0128444 A1 Jun. 15, 2006

(30) Foreign Application Priority Data

Dec. 13, 2004 (JP) ................................. 2004-359635

(51) Int. Cl.
*H04M 1/00* (2006.01)
(52) U.S. Cl. .................... 455/569.1; 379/433.03; 381/91
(58) Field of Classification Search ............... 455/569.1, 455/575.1, 550.1; 379/433.03, 433.01; 381/91, 381/355
See application file for complete search history.

(56) References Cited

U.S. PATENT DOCUMENTS

| | | | |
|---|---|---|---|
| 5,788,516 A | | 8/1998 | Uggmark |
| 6,654,464 B2 * | | 11/2003 | Roussy et al. ........... 379/433.05 |
| 6,773,300 B1 * | | 8/2004 | Sudo et al. .................... 439/500 |
| 7,236,588 B2 * | | 6/2007 | Gartrell ..................... 379/433.01 |
| 7,239,899 B2 * | | 7/2007 | Lin .............................. 455/575.1 |
| 2002/0009207 A1 * | | 1/2002 | Kim ................................ 381/361 |
| 2002/0131615 A1 * | | 9/2002 | Komiyama et al. .......... 381/355 |
| 2003/0008676 A1 * | | 1/2003 | Baumhauer et al. .......... 455/550 |

FOREIGN PATENT DOCUMENTS

| | | |
|---|---|---|
| CN | 1145142 A | 3/1997 |
| CN | 1377172 A | 10/2002 |
| CN | 2525302 Y | 12/2002 |
| DE | 101 06 588 | 11/2002 |
| EP | 1 154 617 | 11/2001 |
| EP | 1 351 474 | 10/2003 |
| JP | 62-146079 A | 6/1987 |
| JP | 62-172753 U | 11/1987 |
| JP | 10-23121 A | 1/1998 |
| JP | 10-65775 A | 3/1998 |
| JP | 2004-120598 A | 4/2004 |
| WO | 02/091793 | 11/2002 |

\* cited by examiner

*Primary Examiner* — Edward Urban
*Assistant Examiner* — Christian A Hannon
(74) *Attorney, Agent, or Firm* — Sughrue Mion, PLLC

(57) ABSTRACT

An electronic device includes a microphone, a microphone holder holding the microphone therein, and a case encasing the microphone holder therein. The microphone holder has a first portion at which the microphone holder makes contact with a first inner surface of the case, and a second portion at which the microphone holder makes contact with one of a part of the electronic device and a second inner surface of the case facing the first inner surface, the microphone holder being sandwiched between the first inner surface and the part. At least one of the first and second portions of the microphone holder is disposed more outwardly than an outer edge of the microphone in a plane which is in parallel with the first inner surface.

34 Claims, 9 Drawing Sheets

ELECTRONIC DEVICE AND MICROPHONE HOLDER THEREFOR

BACKGROUND OF THE INVENTION

1. Field of the Invention

The invention relates to a support of a microphone in an electronic device such as a mobile phone.

2. Description of the Related Art

In an electronic device such as a mobile phone and a video-camera set, a microphone is encased in a main case. It is important for such a microphone that it is supported in a main case so as not to receive vibration from the main case.

In order to ensure a microphone to be free of vibration, a conventional microphone was encased in a main case with the microphone being encased in a rubber-holder. The compliance (elastic deformation) of the rubber-holder prevents vibration from transferring to the microphone from the main case.

FIG. 1A is a front view of a conventional mobile phone, and FIG. 1B is a cross-sectional view taken along the line IB-IB.

As illustrated in FIGS. 1A and 1B, the illustrated conventional mobile phone is comprised of a microphone 101, a microphone holder 102 holding the microphone 101 therein, a main case 103 encasing the microphone holder 102 therein, a printed wiring board 104 for controlling operation of the mobile phone, a receiver 105 supported on the printed wiring board 104 with a holder 111 being sandwiched therebetween, a liquid crystal display device 107, and an antenna 108.

The main case 103 is formed with a voice-opening 106 in alignment with the receiver 105.

The microphone holder 102 is sandwiched between an inner surface of the main case 103 and the printed wiring board 104.

The microphone 101 is electrically connected to the printed wiring board 104 through electrically conductive elastomer 109 filled in an opening formed at a bottom of the microphone holder 102.

The microphone 101 makes air-communication with outside of the main case 103 through both an opening formed at an upper wall of the microphone holder 102 and a microphone-opening 110 formed at an upper wall of the main case 103.

For instance, Japanese Patent Application Publication No. 10-65775 has suggested a mobile phone including a microphone holder which makes point-contact with a microphone in order to prevent the microphone from receiving vibration caused by howling or a user. In the Publication, a microphone-opening is defined by a main case.

A main case of an electronic device such as a mobile phone is usually composed of a material having relatively high rigidity, such as a mold, and hence, tends to receive external vibration. In the mobile phone illustrated in FIGS. 1A and 1B, since the microphone-opening 110 is formed at the main case 103, vibration is transferred to the microphone 101 from the main case 103 through the microphone-opening 110.

Accordingly, though the microphone holder 102 is composed of elastic material, vibration caused at the main case 102 is not sufficiently cut off.

The mobile phone suggested in Japanese Patent Application Publication No. 10-65775 is accompanied with the same problem as mentioned above, because the microphone-opening is defined at the main case 103.

In addition, since the microphone holder 102 encasing the microphone 101 therein is sandwiched between the printed wiring board 104 and the main case 103, the microphone holder 102 is pressurized by them. As a result, the microphone holder 102 cannot keep compliance, and accordingly, the microphone 101 is likely to receive external vibration.

The mobile phone suggested in Japanese Patent Application Publication No. 10-65775 is accompanied with the same problem as mentioned above, because the microphone is pressurized in an area at which the microphone holder makes point-contact with the microphone.

Japanese Patent Application Publication No. 62-146079 has suggested a video-camera set including a case, a camera, a rotary head recorder, and a non-directional microphone. The camera and the recorder are encased in the case. The non-directional microphone is disposed at the center of a front panel in which a lens of the camera is arranged.

Japanese Patent Application Publication No. 10-23121 has suggested a phone including a case formed with a plurality of microphone-openings through which voice is transferred to a microphone.

SUMMARY OF THE INVENTION

In view of the above-mentioned problems in the prior art, it is an object of the present invention to provide an electronic device and a microphone holder both of which are capable of sufficiently preventing vibration from transferring to a microphone from a main case.

Hereinbelow are described an electronic device and a microphone holder in accordance with the present invention through the use of reference numerals used in later described embodiments. The reference numerals are indicated only for the purpose of clearly showing correspondence between claims and the embodiments. It should be noted that the reference numerals are not allowed to interpret claims of the present application.

In one aspect of the present invention, there is provided an electronic device (10, 10A, 10B, 10C) including a microphone (1), a microphone holder (2) holding the microphone (1) therein, and a case (3) encasing the microphone holder (2) therein, wherein the microphone holder (2) has a first portion (23) at which the microphone holder (2) makes contact with a first inner surface (31) of the case (3), and a second portion (24) at which the microphone holder (2) makes contact with one of a part (4) of the electronic device and a second inner surface (31A) of the case (3) facing the first inner surface (31), the microphone holder (2) being sandwiched between the first inner surface (31) and the part (4), and at least one of the first and second portions (23, 24) of the microphone holder (2) is disposed more outwardly than an outer edge of the microphone (1) in a plane which is in parallel with the first inner surface (31).

It is preferable that the first and second portions (23, 24) of the microphone holder (2) are disposed more outwardly than an outer edge of the microphone (1) in a plane which is in parallel with the first inner surface (31).

For instance, the first portion (23) of the microphone holder (2) projects out of a main body of the microphone holder (2) along the first inner surface (31).

For instance, the first portion (23) of the microphone holder (2) projects upwardly from a main body (21) of the microphone holder (2).

For instance, the second portion (24) of the microphone holder (2) projects from a main body (21) of the microphone holder (2) towards the part (4) or the second inner surface (31A).

For instance, at least one of the first and second portions (23, 24) of the microphone holder (2) is ring-shaped.

For instance, the part (4) is in the form of a plate, the second portion (24) of the microphone holder (2) making contact with an upper surface (41) of the plate.

For instance, the part (4) comprises a printed wiring board (4).

It is preferable that the plate is formed with an opening (301) having an inner edge disposed more outwardly than an outer edge of the microphone (1), and a bottom of the microphone (1) makes contact with the inner edge of the opening (301) to thereby cause the second portion (24) corresponding to the bottom of the microphone (1) to make contact with the part (4).

It is preferable that the microphone (1) makes electrical contact with a control board of the electronic device through a flexible wire (9).

It is preferable that the microphone holder (2) is formed with a voice-opening (25) through which the microphone (1) makes air communication with outside of the case (3), the microphone holder (2) is composed of elastic material at least around the voice-opening (25), and the voice-opening (25) and the elastic material are exposed outside through an opening (32) formed at the case (3).

It is preferable that an outer surface of the case (3) and an upper surface of the elastic material are on a level with each other.

It is preferable that the electronic device further includes a cover (501) which covers the microphone holder (2) therewith.

It is preferable that the electronic device has a function of making communication with another device.

For instance, the electronic device comprises a mobile phone (10, 10A, 10B, 10C).

There is further provided an electronic device (10, 10A, 10B, 10C) including a microphone (1), a microphone holder (2) holding the microphone (1) therein, and a case (3) encasing the microphone holder (2) therein, wherein the microphone holder (2) is formed with a voice-opening (25) through which the microphone (1) makes air communication with outside of the case (3), the microphone holder (2) is composed of elastic material at least around the voice-opening (25), and the voice-opening (25) and the elastic material are exposed outside through an opening (32) formed at the case (3).

It is preferable that an outer surface of the case (3) and an upper surface of the elastic material are on a level with each other.

In another aspect of the present invention, there is provided a microphone holder (2) encased in a case (3) for holding a microphone (1) therein, wherein the microphone holder (2) has a first portion (23) at which the microphone holder (2) makes contact with a first inner surface (31) of the case (3), and a second portion (24) at which the microphone holder (2) makes contact with one of a part (4) of the electronic device and a second inner surface (31A) of the case (3) facing the first inner surface (31), the microphone holder (2) being sandwiched between the first inner surface (31) and the part (4), and at least one of the first and second portions (23, 24) of the microphone holder (2) is disposed more outwardly than an outer edge of the microphone (1) in a plane which is in parallel with the first inner surface (31).

It is preferable that the first and second portions (23, 24) are disposed more outwardly than an outer edge of the microphone (1) in a plane which is in parallel with the first inner surface (31).

It is preferable that the first portion (23) projects out of a main body of the microphone holder (2) along the first inner surface (31).

It is preferable that the first portion (23) projects upwardly from a main body (21) of the microphone holder (2).

It is preferable that the second portion (24) projects from a main body (21) of the microphone holder (2) towards the part (4) or the second inner surface (31A).

It is preferable that the microphone holder (2) is formed with a voice-opening (25) through which the microphone (1) makes air communication with outside of the case (3), the microphone holder (2) is composed of elastic material at least around the voice-opening (25), and the voice-opening (25) and the elastic material are exposed outside through an opening (32) formed at the case (3).

It is preferable that an upper surface of the elastic material is on a level with an outer surface of the case (3).

There is further provided a microphone holder (2) encases in a case (3) for holding a microphone (1) therein, wherein the microphone holder (2) is formed with a voice-opening (25) through which the microphone (1) makes air communication with outside of the case (3), the microphone holder (2) is composed of elastic material at least around the voice-opening (25), and the voice-opening (25) and the elastic material are exposed outside through an opening (32) formed at the case (3).

In still another aspect of the present invention, there is provided a method of fabricating an electronic device including a microphone (1), a microphone holder (2) holding the microphone (1) therein, and a case (3) encasing the microphone holder (2) therein, the microphone holder (2) having a first portion (23) at which the microphone holder (2) makes contact with a first inner surface (31) of the case (3), and a second portion (24) at which the microphone holder (2) makes contact with one of a part (4) of the electronic device and a second inner surface (31A) of the case (3) facing the first inner surface (31), the microphone holder (2) being sandwiched between the first inner surface (31) and the part (4), at least one of the first and second portions (23, 24) of the microphone holder (2) being disposed more outwardly than an outer edge of the microphone (1) in a plane which is in parallel with the first inner surface (31), the method including holding the microphone (1) in the microphone holder (2), and encasing the microphone holder (2) in the case (3) such that the first portion (23) makes contact with a first inner surface (31) of the case (3), and the second portion (24) makes contact with one of the part (4) and the second inner surface (31A).

The advantages obtained by the aforementioned present invention will be described hereinbelow.

In accordance with the present invention, the microphone holder is designed to have a first portion at which the microphone holder makes contact with a first inner surface of the case, and a second portion at which the microphone holder makes contact with a part of the electronic device or a second inner surface of the case facing the first inner surface. Furthermore, the first and/or second portions are(is) disposed more outwardly than an outer edge of the microphone in a plane which is in parallel with the first inner surface. Thus, it is possible to prevent the microphone from receiving at least one of a pressure caused from the case and a pressure caused from the part, and hence, the microphone can kept free of vibration caused from the main case.

In particular, by designing both of the first and second portions to be disposed more outwardly than an outer edge of the microphone in a plane which is in parallel with the first inner surface, it is possible to prevent the microphone from receiving both a pressure caused from the case and a pressure caused from the part, and hence, the microphone can kept free of vibration caused from the main case.

The microphone holder may be formed with a voice-opening through which the microphone makes air communication with outside of the case, in which case, the microphone holder is composed of elastic material at least around the voice-opening. The voice-opening and the elastic material are exposed outside through an opening formed at the case. Thus, the elastic material covering the microphone holder therewith prevents vibration caused from the main case from transferring to the microphone. Hence, the microphone can be kept free of vibration.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1A:
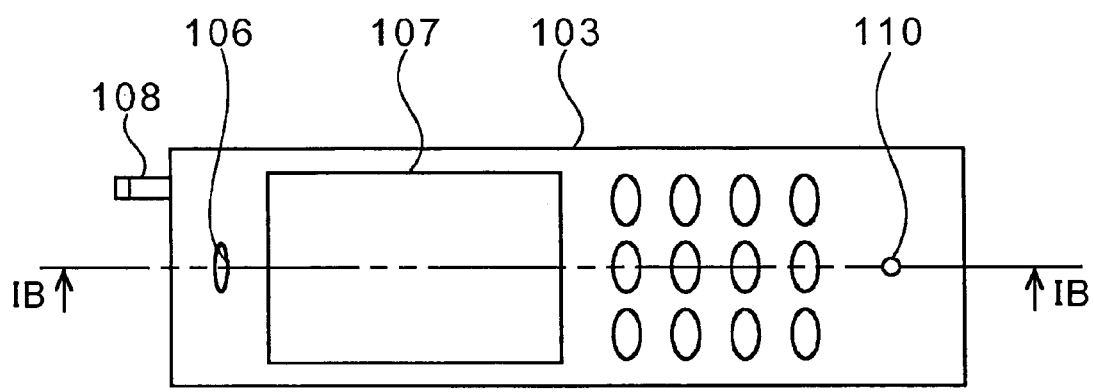
FIG. 1A is a front view of a conventional mobile phone.
Figure 1B:
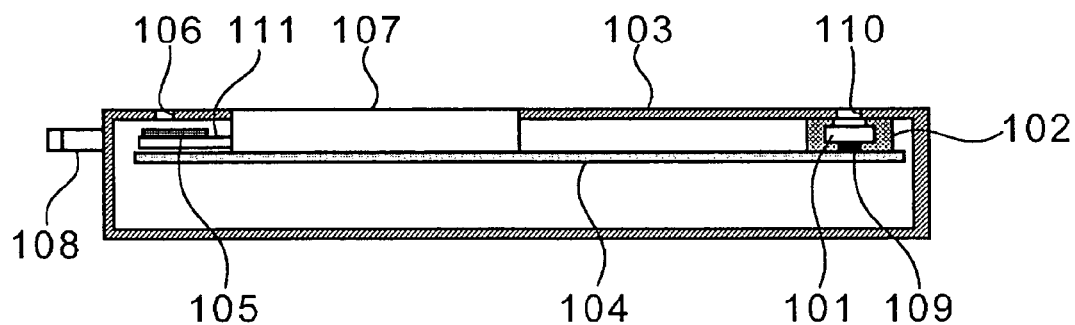
FIG. 1B is a cross-sectional view taken along the line IB-IB.

Preferred embodiments in accordance with the present invention will be explained hereinbelow with reference to drawings.

First Embodiment

The mobile phone 10 in accordance with the first embodiment includes a microphone 1, a microphone holder 2 holding the microphone 1 therein, a main case 3 encasing the microphone holder 2 therein, a printed wiring board 4 for controlling operation of the mobile phone 10, a receiver 5 mounted on the printed wiring board 4 with a holder 11 being sandwiched therebetween, a liquid crystal display device 7 as a display unit, and an antenna 8.

The main case 3 is formed with a receiver-opening 6 in alignment with the receiver 5 for transferring voices emitted from the receiver 5, to outside of the main case 3.

Figure 3:
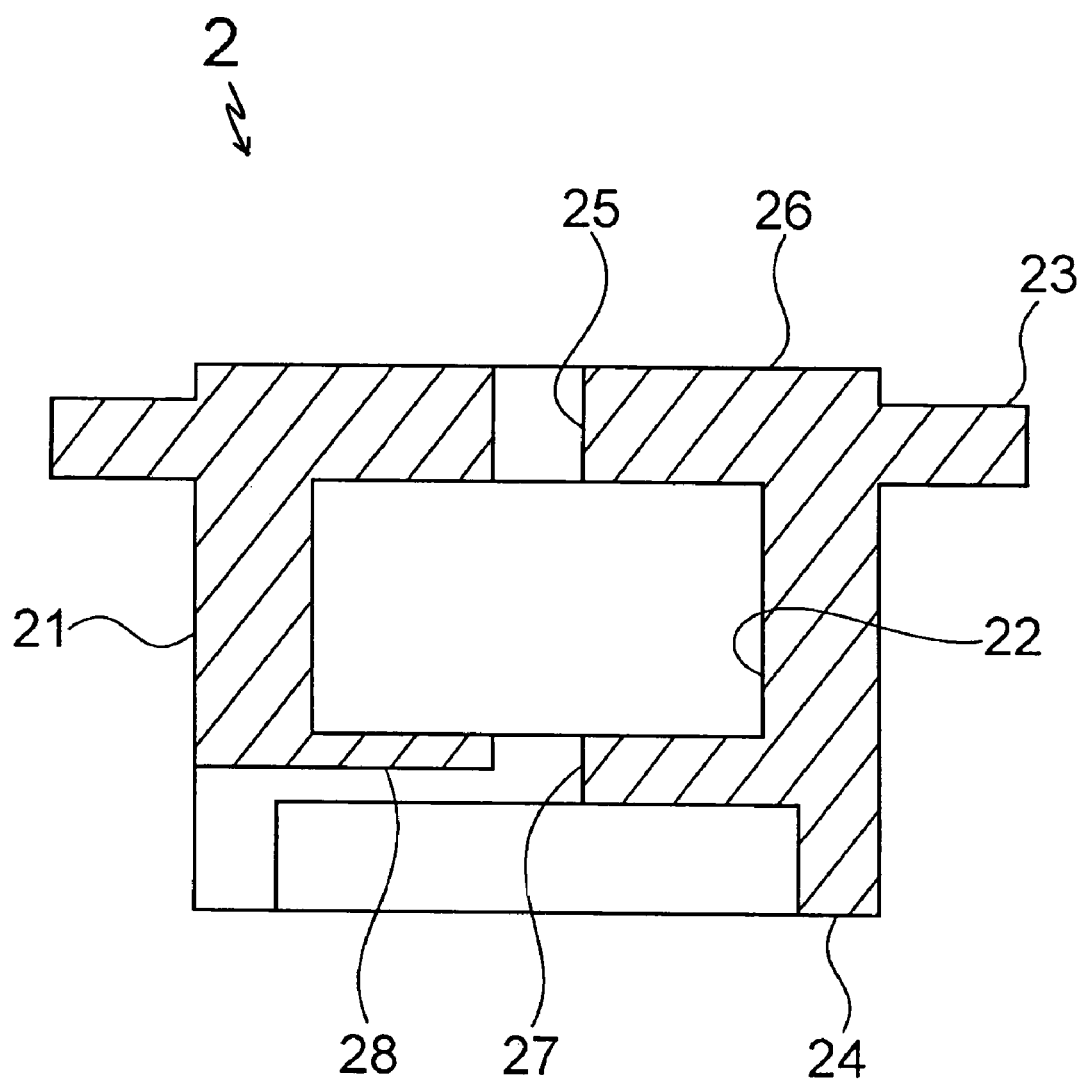
FIG. 3 is an enlarged cross-sectional view of the microphone holder in accordance with the first embodiment of the present invention.

FIG. 3 is an enlarged cross-sectional view of the microphone holder 2.

The microphone holder 2 is composed of electrically non-conductive elastic material such as rubber or elastomer, for instance.

As illustrated in FIG. 3, the microphone holder 2 is comprised of a main body 21 in the form of a cylinder, a first portion 23 projecting laterally from the main body 21 in the form of a rib, and making contact with a first inner surface 31 of the main case 3, and a second portion 24 projecting downwardly from the main body 21 in the form of a rib, and making contact with an upper surface 41 of the printed wiring board 4.

The main body 21 is designed to be hollow to have a room 22 in which the microphone 1 is to be encased.

The first and second portions 23 and 24 are designed to be disposed more outwardly than an outer edge of the microphone 1 in a plane which is in parallel with the first inner surface 31 of the main case 3.

The first and second portions 23 and 24 extend from the main body 21 perpendicularly with each other. Specifically, the first portion extends along the first inner surface 31 of the main case 3 when the microphone holder 2 is fixed in the main case 3, and the second portion 24 extends perpendicularly towards the printed wiring board 4 when the microphone holder 2 is fixed in the main case 3.

For instance, the first and second portions 23 and 24 may be designed to be ring-shaped, or designed to be comprised of a plurality of divisions.

The main body 21 of the microphone holder 2 is formed with a microphone-opening 25 through which the room 22 makes air communication with outside of the microphone holder 2.

A portion 26 of the main body 21 around the microphone-opening 25 slightly upwardly projects beyond the first portion 23. The portion 26 in the first embodiment is designed to be circular. However, it should be noted that the portion 26 may be designed to have any shape such as a rectangle or an ellipse.

The microphone 1 is electrically connected to the printed wiring board 4 through a flexible sheet-shaped wire 9. Voice signals captured through the microphone 1 are transferred to the printed wiring board 4 through the flexible sheet-shaped wire 9. In order to electrically connect the microphone 1 to the printed wiring board 4 through the wire 9, the main body 21 is formed with a hole 27 through which the wire 9 extends to outside of the room 22 from inside of the room 22, and a groove 28 formed continuous with the hole 27 for guiding the wire 9 to outside of the microphone holder 2.

Figure 2A:
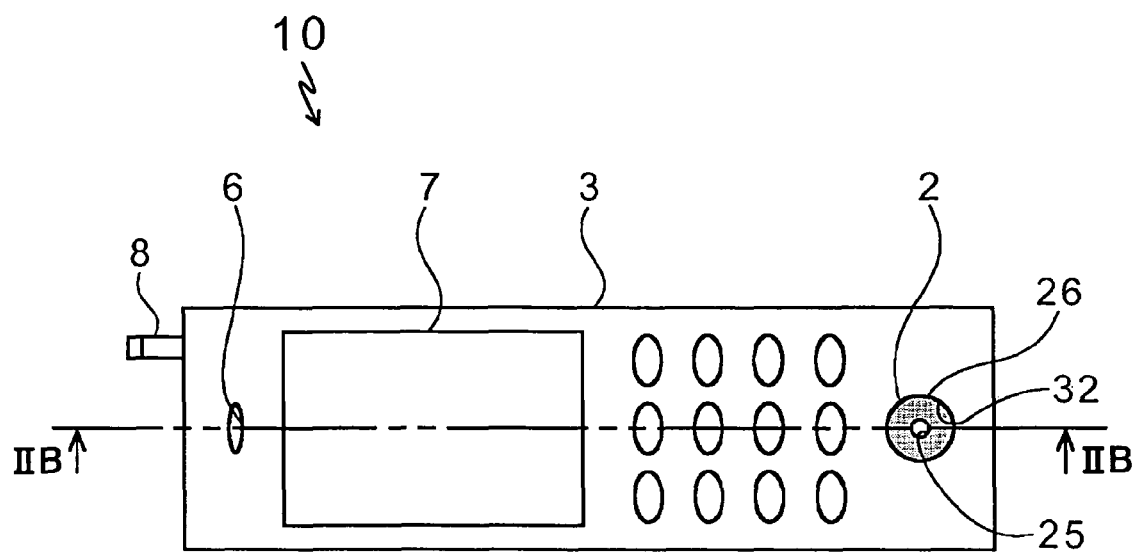
FIG. 2A is a front view of a mobile phone in accordance with the first embodiment of the present invention.
Figure 2B:
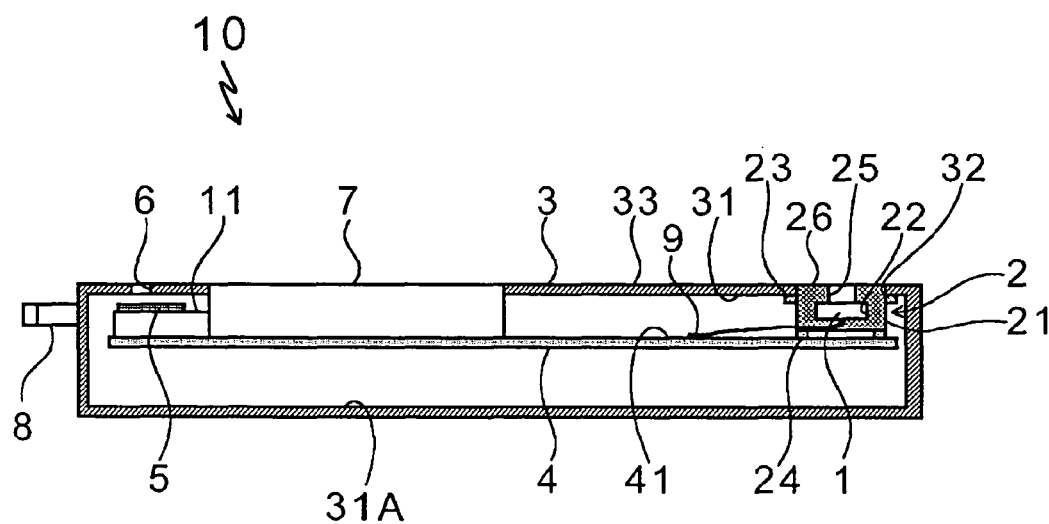
FIG. 2B is a cross-sectional view taken along the line IIB-IIB in FIG. 2A.

As illustrated in FIG. 2B, the microphone holder 2 holding the microphone 1 in the room 22 is sandwiched between the upper surface 41 of the printed wiring board 4 and the first inner surface 31 of the main case 3.

When the first portion 23 makes contact with the first inner surface 31 of the main case 3, the microphone-opening 25 and the portion 26 are exposed outside through an opening 32 formed at an upper wall of the main case 3.

Furthermore, an outer surface 33 of the main case 3 is on a level with an upper surface of the portion 26.

The second portion 24 makes contact with the upper surface 41 of the printed wiring board 4. In other words, the second portion 24 stands on the printed wiring board 4.

While the microphone holder 2 is fixed in the main case 3, the first and second portions 23 and 24 receive pressures from the main case 3 and the printed wiring board 4. However, those pressures are not transferred to the microphone 1, and hence, the microphone 1 is kept free of any pressures.

The conventional mobile phone is accompanied with problems that since the main case 3 is composed of a material having relatively high rigidity, such as mold, the main case 3 tends to transfer external vibration to the microphone 1, and that acoustic waves and vibration resulted from the receiver 6, a voice-emitting part, are transferred to the microphone 1 through the main case 3, and accordingly the microphone-opening 25 captures the vibration. In contrast, in the mobile phone 10 in accordance with the first embodiment, the portion 26 composed of elastic material absorbs vibration, and hence, prevents the acoustic waves and vibration resulted from the receiver 6 from being transferred to the microphone 1 through the main case 3.

Figure 4:
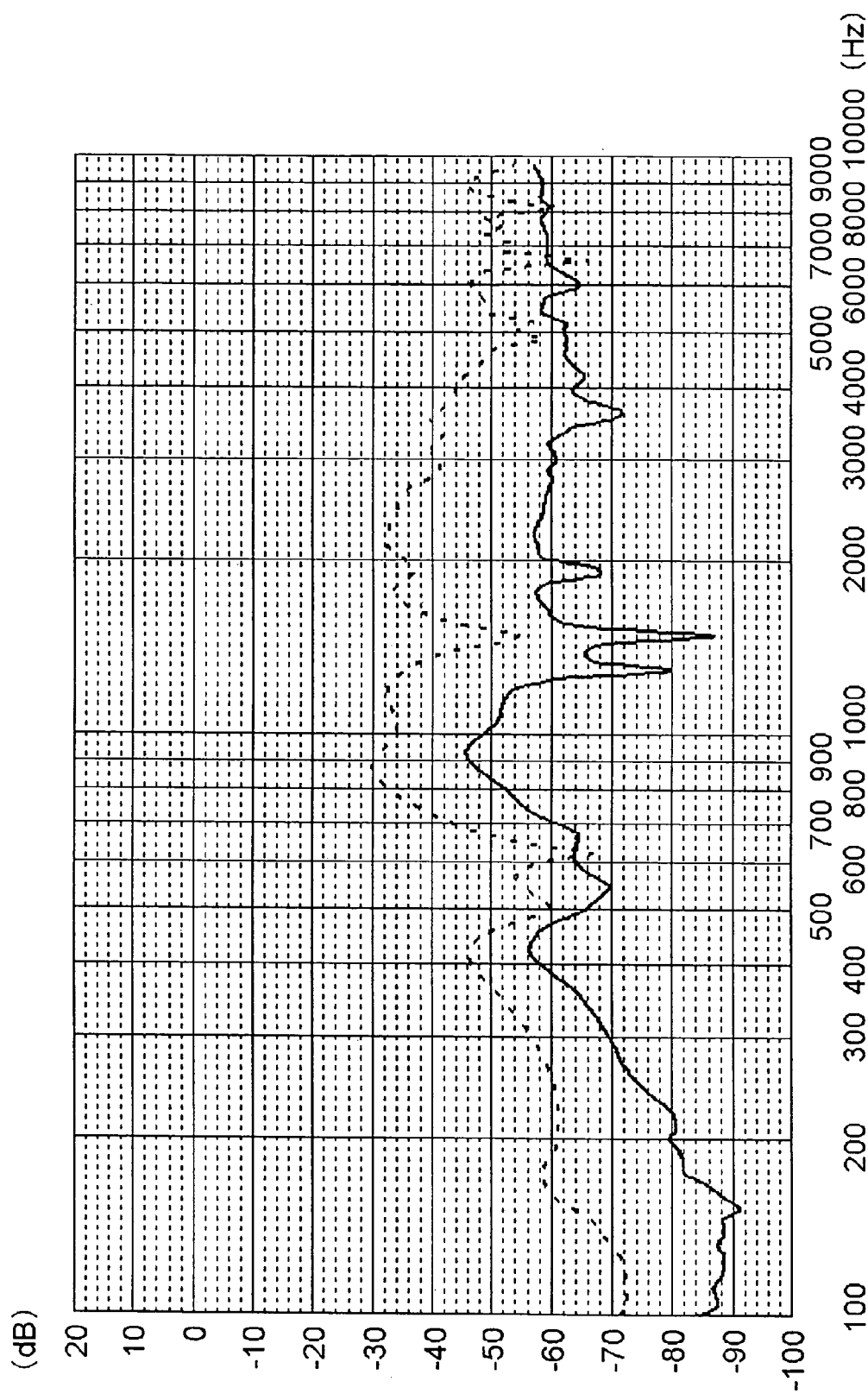
FIG. 4 is a graph showing echo loss defined as suppression of vibration in both a conventional mobile phone and the mobile phone in accordance with the first embodiment.

FIG. 4 is a graph showing echo loss defined as suppression of vibration in both the conventional mobile phone and the mobile phone 10 in accordance with the first embodiment. In FIG. 4, the solid line shows echo loss caused by the mobile phone 10 in accordance with the first embodiment, and the broken line shows echo loss caused by the conventional mobile phone.

As illustrated in FIG. 4, the echo loss caused by the mobile phone 10 is smaller than the echo loss caused by the conventional mobile phone by 10 to 20 dB over a frequency in the range of 100 Hz to 4 kHz.

In the mobile phone 10 in accordance with the first embodiment, the microphone holder 2 is fixedly sandwiched between the main case 3 and the printed wiring board 4 through the first and second portions 23 and 24 both disposed more outwardly than an outer edge of the microphone 1, and hence, it is possible to prevent a pressure transferred to the microphone holder 2 from the main case 3 and the printed wiring board 4 from being transferred further to the microphone 1.

Thus, it is possible to fix the microphone holder 2 such that the microphone 1 can kept free of vibration caused from the main case 3.

Furthermore, the microphone holder 2 is formed with the microphone-opening 25, and the microphone-opening 25 and the portion 26 are exposed outside through the opening 32 formed at an upper wall of the main case 3. Since the microphone holder 2 is composed entirely of elastic material such as rubber, the portion 26 disposed around the microphone-opening 25 is also composed of elastic material. Since the portion 26 absorbs vibration transferred through the main case 3, the microphone 1 would not receive the vibration through the microphone-opening 25.

In addition, unlike the conventional mobile phone in which the microphone-opening is defined as a part of the main case, the microphone-opening 25 in the mobile phone 10 is defined as a part of the microphone holder 2. Hence, it would be possible to prevent vibration from being transferred to the microphone 1 through the microphone-opening 25.

Furthermore, the mobile phone 10 in accordance with the first embodiment can suppress vibration more effectively than the conventional mobile phone, as shown in FIG. 4, over a frequency of 100 Hz to 4 kHz, for instance.

Second Embodiment

Figure 5A:
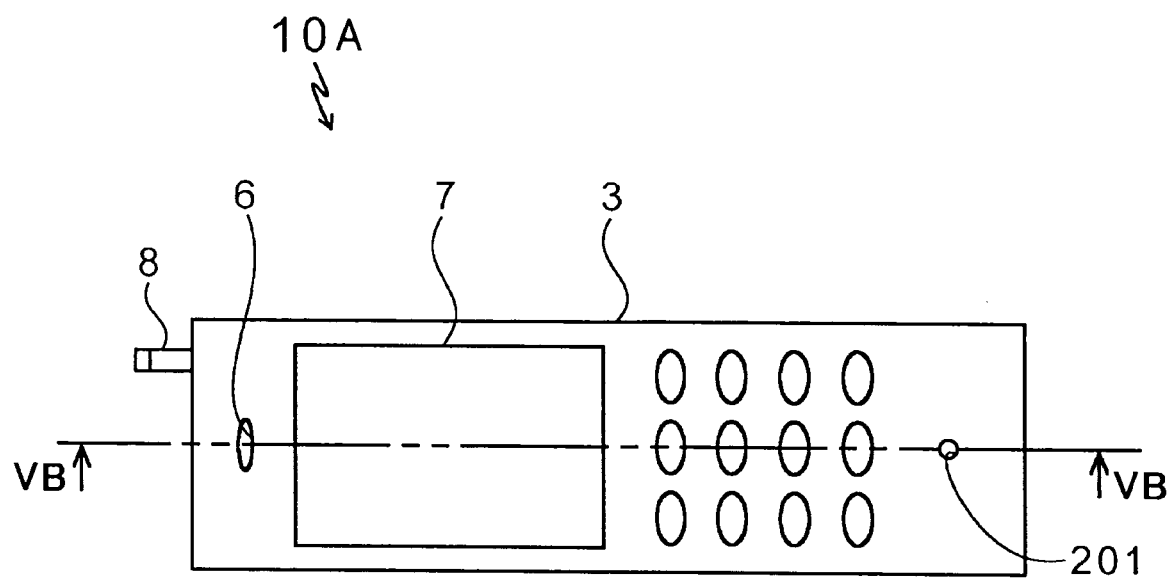
FIG. 5A is a front view of a mobile phone in accordance with the second embodiment of the present invention.
Figure 5B:
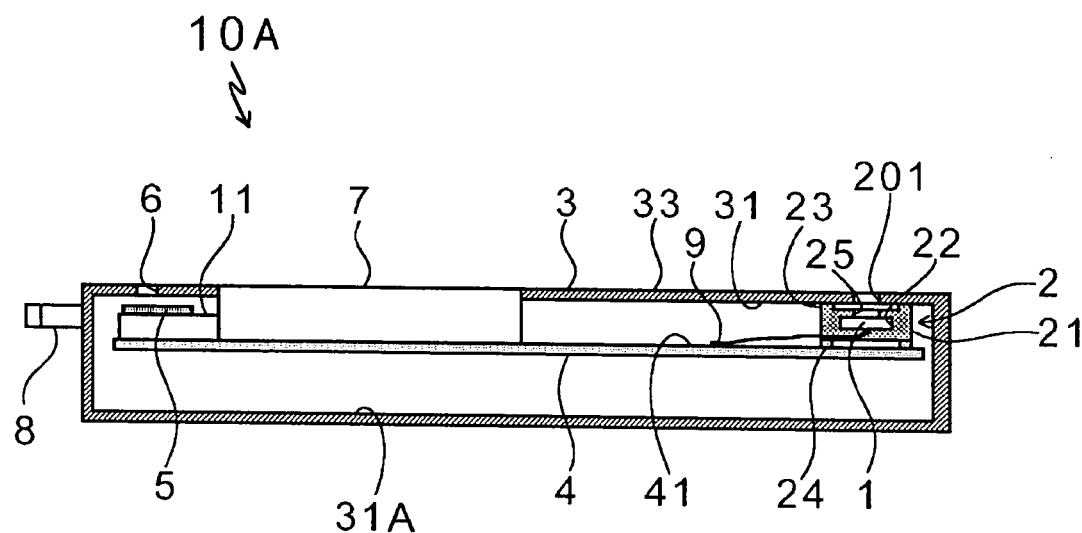
FIG. 5B is a cross-sectional view taken along the line VB-VB in FIG. 5A.

FIG. 5A is a front view of a mobile phone 10A in accordance with the second embodiment of the present invention, and FIG. 5B is a cross-sectional view taken along the line VB-VB in FIG. 5A.

In FIGS. 5A and 5B, parts or elements that correspond to those of the mobile phone 10 illustrated in FIGS. 2A and 2B have been provided with the same reference numerals, and operate in the same manner as corresponding parts or elements in the first embodiment, unless explicitly explained hereinbelow.

As illustrated in FIGS. 5A and 5B, the first portion 23 in the second embodiment extends in a different direction from a direction in which the first portion 23 in the first embodiment extends.

Specifically, the first portion 23 in the second embodiment projects upwardly out of the main body 21 in the form of a rib, and makes contact with the first inner surface 31 of the main case 3.

As illustrated in FIG. 5B, the microphone-opening 25 is disposed in the main case 3.

The main case 3 is formed with a voice-opening 201 in place of the opening 32 in the first embodiment. The voice-opening 201 is coaxial with the microphone-opening 25. Thus, the microphone-opening 25 and the portion 26 in the second embodiment are not exposed outside, but disposed in the main case 3.

Figure 6:
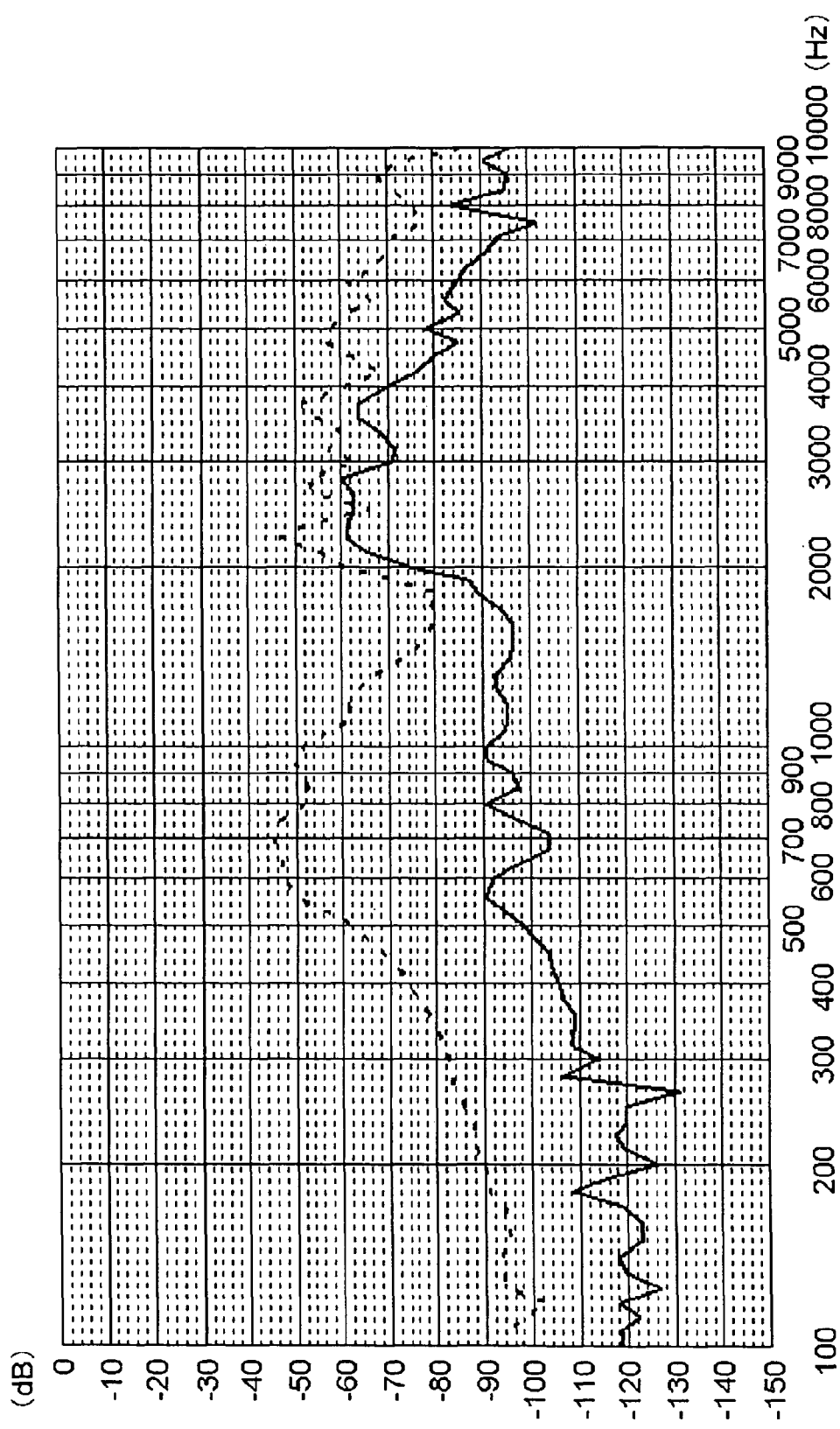
FIG. 6 is a graph showing echo loss defined as suppression of vibration in both a conventional mobile phone and the mobile phone in accordance with the second embodiment.

FIG. 6 is a graph showing echo loss defined as suppression of vibration in both the conventional mobile phone and the mobile phone 10A in accordance with the second embodiment. In FIG. 6, the solid line shows echo loss caused by the mobile phone 10A in accordance with the second embodiment, and the broken line shows echo loss caused by the conventional mobile phone.

As illustrated in FIG. 6, the echo loss caused by the mobile phone 10A is smaller than the echo loss caused by the conventional mobile phone by 10 to 20 dB over a frequency in the range of 100 Hz to 2 kHz.

The suppression of vibration in the second embodiment is lower than the same in the first embodiment at a frequency equal to or higher than 2 kHz. Thus, the second embodiment is higher in the suppression of vibration than the first embodiment in a high frequency. This shows that it is possible to suppress the vibration in a high frequency (for instance, 2 kHz or greater) by exposing both the microphone-opening 25 and the portion 26 outside of the main case 3 through the opening 32.

Furthermore, it is understood that it is possible to suppress the vibration in a low frequency (for instance, 2 kHz or smaller) by a structure common to the first and second embodiments, that is, a structure in which the microphone holder 2 makes contact with the main case 3 and the printed wiring board 4 through the first and second portions 23 and 24 both disposed more outwardly than an outer edge of the microphone 1.

In accordance with the second embodiment, since the microphone holder 2 makes contact with the main case 3 and the printed wiring board 4 through the first and second portions 23 and 24 both disposed more outwardly than an outer edge of the microphone 1, and is fixedly sandwiched between the main case 3 and the printed wiring board 4, it would be possible to prevent the pressure acting on the microphone holder 2 from the main case 3 and the printed wiring board 4, from being transferred to the microphone 1. Hence, the microphone 1 can be encased in the microphone holder 2 in such a condition that the microphone is kept free of vibration, and hence, it is possible to prevent vibration from being transferred to the microphone 1 from the main case 3.

Furthermore, the mobile phone 10A in accordance with the second embodiment can suppress vibration more effectively than the conventional mobile phone, as shown in FIG. 6, in a low frequency (for instance, 2 kHz or smaller).

Third Embodiment

Figure 7:
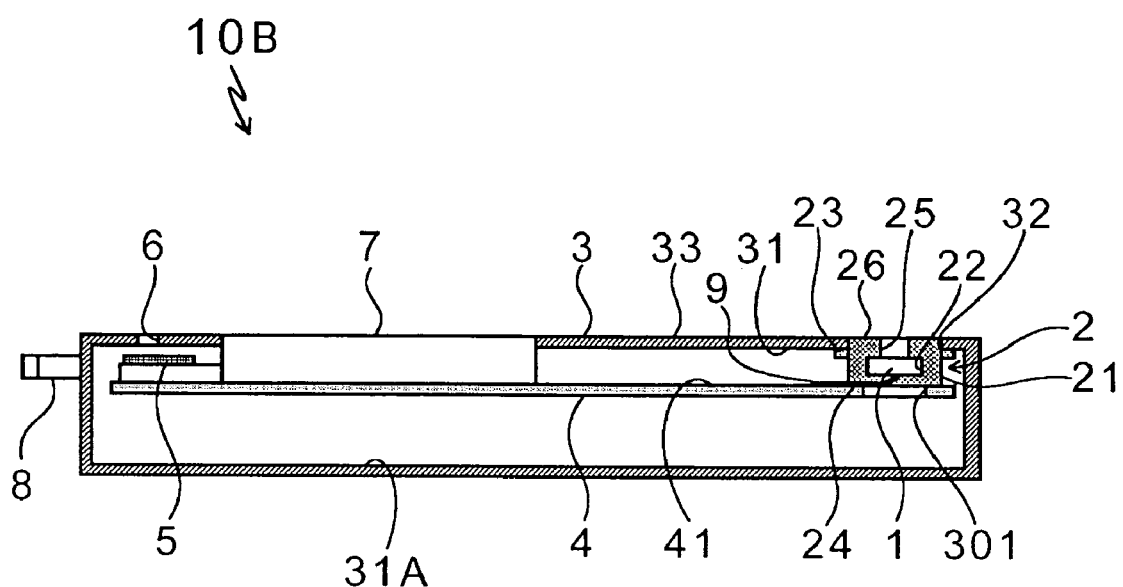
FIG. 7 is a cross-sectional view of a mobile phone in accordance with the third embodiment of the present invention.

FIG. 7 is a cross-sectional view of a mobile phone 10B in accordance with the third embodiment of the present invention, corresponding to FIG. 2B in the first embodiment.

In FIG. 7, parts or elements that correspond to those of the mobile phone 10 illustrated in FIGS. 2A and 2B have been provided with the same reference numerals, and operate in the same manner as corresponding parts or elements in the first embodiment, unless explicitly explained hereinbelow.

The mobile phone 10B in accordance with the third embodiment is structurally different from the mobile phone 10 in accordance with the first embodiment with respect to a structure of the second portion 24.

As illustrated in FIG. 7, the microphone holder 2 is designed to have a flat bottom. Namely, the second portion 24 in the third embodiment does not project towards the printed wiring board 4 unlike the second portion 24 in the first embodiment.

The printed wiring board 4 is formed with an opening 301 which is smaller than the bottom of the microphone holder 2 but bigger than an outer edge of the microphone 1. The second portion 24 makes contact with an inner edge of the opening 301. That is, the second portion 24 in the third embodiment is comprised of a portion of the bottom of the microphone holder 2 which makes contact with the upper surface 41 of the printed wiring board 4.

Thus, the microphone holder 2 makes contact with both the main case 3 and the printed wiring board 4 through the first and second portions 23 and 24 disposed more outwardly than an outer edge of the microphone 1.

In accordance with the third embodiment, the microphone holder 2 is sandwiched between an edge of the opening 301 and the first inner surface 31 of the main case 3, and hence, the microphone holder 2 makes contact with the main case 3 and the printed wiring board 4 through the first and second portions 23 and 24 disposed more outwardly than an outer edge of the microphone 1. Hence, the mobile phone 10B in accordance with the third embodiment provides the same advantages as those provided by the mobile phone 10 in accordance with the first embodiment.

Similarly to the second embodiment, the microphone-opening 25 and the portion 26 may be designed not to be exposed outside of the main case 3, but to be disposed in the main case 3, in which case, the first portion 31 is designed to project towards the first inner surface 31 of the main case 3. This structure provides the same advantages as those provided by the mobile phone 10A in accordance with the second embodiment.

Fourth Embodiment

Figure 8:
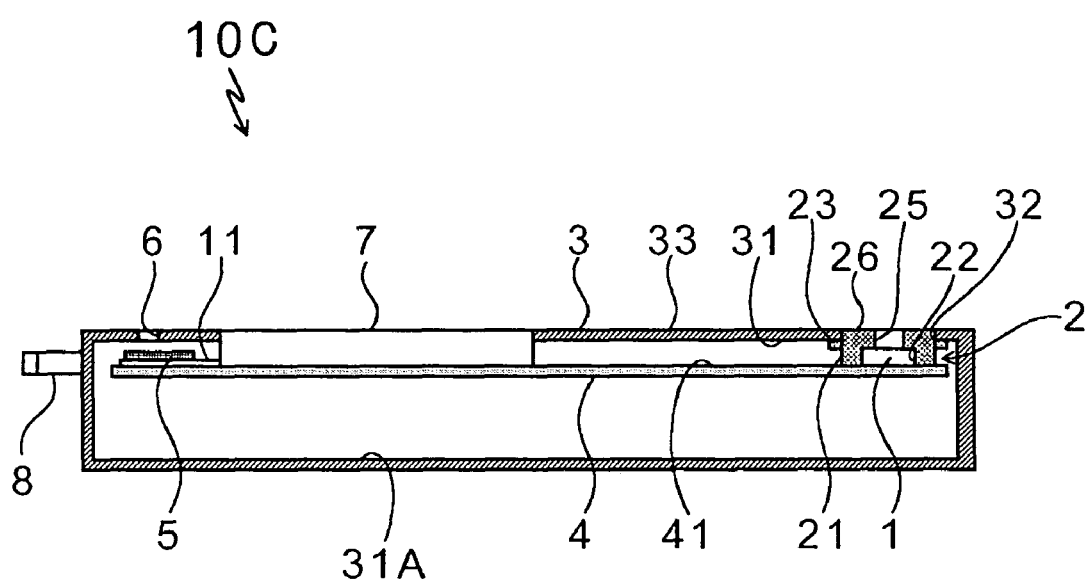
FIG. 8 is a cross-sectional view of a mobile phone in accordance with the fourth embodiment of the present invention.

FIG. 8 is a cross-sectional view of a mobile phone 10C in accordance with the fourth embodiment of the present invention, corresponding to FIG. 2B in the first embodiment.

In FIG. 8, parts or elements that correspond to those of the mobile phone 10 illustrated in FIGS. 2A and 2B have been provided with the same reference numerals, and operate in the same manner as corresponding parts or elements in the first embodiment, unless explicitly explained hereinbelow.

In the above-mentioned first to third embodiments, the microphone 1 is a part separate from the printed wiring board 4. In the fourth embodiment explained hereinbelow, the microphone 1 is formed integrally with the printed wiring board 4.

As illustrated in FIG. 8, the microphone 1 is comprised of a capacitor microphone, for instance, and is formed directly on the printed wiring board 4.

In comparison with the microphone holder 2 in the first embodiment, illustrated in FIGS. 2A and 2B, a lower half of the microphone holder 2 is cut away. That is, the room 2 of the microphone holder 2 in the fourth embodiment is open at a bottom thereof.

The microphone holder 2 covers the microphone 1 therewith such that the microphone 1 is disposed in the room 22.

In accordance with the fourth embodiment, the microphone holder 2 makes contact with the main case 3 through the first portion 23 disposed more outwardly than an outer edge of the microphone 1 in such a condition that the microphone holder 2 covers the microphone 1 therewith so that the microphone 1 is disposed in the room 22. As a result, a pressure acting on the microphone holder 2 from the main case 3 is not transferred to the microphone 1.

Thus, it is possible to keep the microphone 1 free of vibration, and hence, it is possible to prevent vibration from being transferred to the microphone 1 from the main case 3.

Furthermore, the microphone holder 2 is formed with the microphone-opening 25, and the microphone-opening 25 and the portion 26 are exposed outside of the main case 3 through the opening 32 formed at an upper wall of the main case 3, similarly to the first embodiment. Since the portion 26 disposed around the microphone-opening 25 is composed of elastic material, the portion 26 absorbs vibration transferred through the main case 3, the microphone 1 would not receive the vibration through the microphone-opening 25.

In addition, unlike the conventional mobile phone in which the microphone-opening is defined as a part of the main case, the microphone-opening 25 in the mobile phone 10C is defined as a part of the microphone holder 2. Hence, it would be possible to prevent vibration from being transferred to the microphone 1 through the microphone-opening 25.

Similarly to the second embodiment, the microphone-opening 25 and the portion 26 may be designed not to be exposed outside of the main case 3, but to be disposed in the main case 3, in which case, the first portion 31 is designed to project towards the first inner surface 31 of the main case 3.

Fifth Embodiment

Figure 9A:
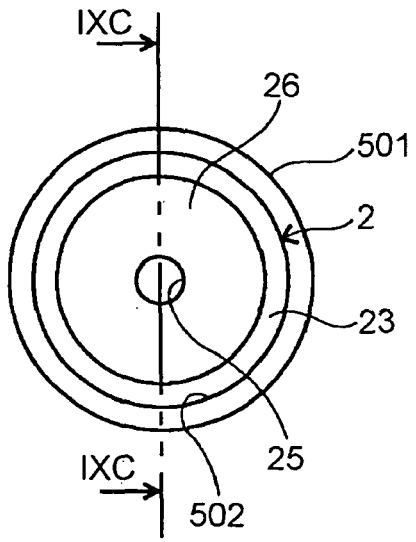
FIG. 9A is a top view of a microphone holder in the fifth embodiment.
Figure 9B:
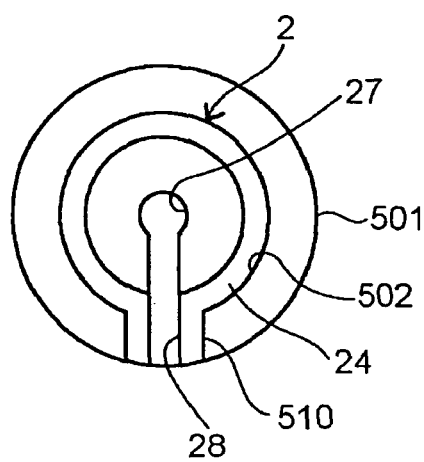
FIG. 9B is a bottom view of a microphone holder in the fifth embodiment.
Figure 9C:
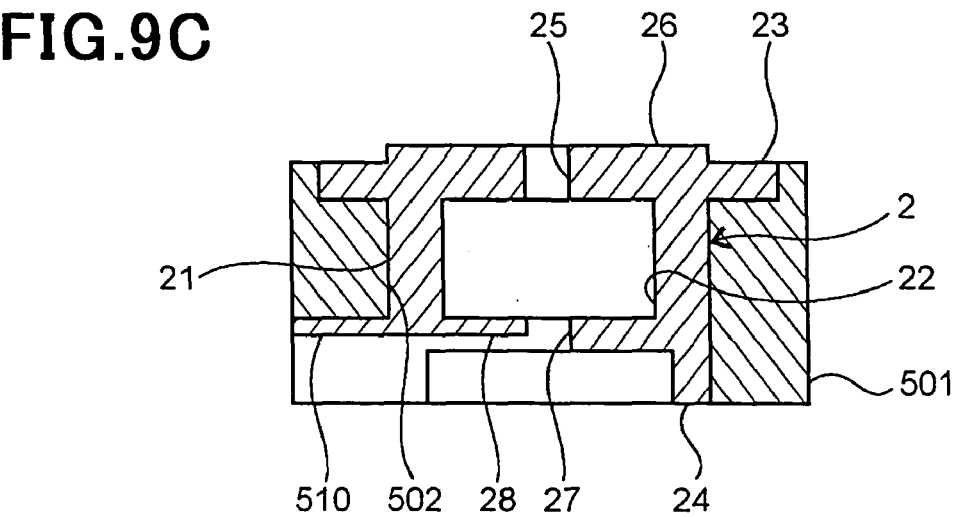
FIG. 9C is a cross-sectional view taken along the line IXC-IXC in FIG. 9A.

FIG. 9A is a top view of the microphone holder 2 in the fifth embodiment, FIG. 9B is a bottom view of the microphone holder 2 in the fifth embodiment, and FIG. 9C is a cross-sectional view taken along the line IXC-IXC in FIG. 9A.

In FIGS. 9A to 9C, parts or elements that correspond to those of the mobile phone 10 illustrated in FIGS. 2A and 2B have been provided with the same reference numerals, and operate in the same manner as corresponding parts or elements in the first embodiment, unless explicitly explained hereinbelow.

As illustrated in FIGS. 9A to 9C, the microphone holder 2 in the fifth embodiment is covered around a sidewall thereof with a cover 501.

The cover 501 is formed axially with a through-hole 502, in which the microphone holder 2 is encased.

The cover 501 is composed of a material different from a material of which the microphone holder 2 is composed, for instance. Specifically, the cover 501 is composed of porous and flexible or elastic material such as sponge.

The cover 501 prevents acoustic waves transferred from the receiver 6 from being transferred to the microphone 1 in the main case 3.

The main body of the microphone holder 2 in the fifth embodiment is structurally identical with the main body 21 in the first embodiment except that the main body 21 in the fifth embodiment has an extended portion 510 extending at a bottom of the main body 21 to an outer edge of the cover 501 from a center of the bottom of the main body 21.

In accordance with the fifth embodiment, since the microphone holder 2 is covered with the cover 501, it would be possible to prevent acoustic waves from being transferred to the microphone 1 from the receiver 6 in the main case 3 more preferably than the above-mentioned first embodiment.

The cover 501 may be applied to the mobile phones 10, 10A, 10B and 10C in accordance with the first to fourth embodiments.

In the above-mentioned first to fifth embodiments, the present invention is applied to a mobile phone as a preferable example of an electronic device. It should be noted that the present invention may be applied to any electronic device, if it includes a microphone. For instance, the present invention may be applied to a telephone except a mobile phone, such as a domestic phone, a codeless phone and a child phone, a transceiver, a video-camera, or a personal computer having a function of making communication with other devices.

In the above-mentioned first to fifth embodiments, the present invention is applied to a bar-type mobile phone. The present invention may be applied to a foldable mobile phone comprised of a first portion, a hinge, and a second portion rotatable about the first portion through the hinge.

In the above-mentioned first, second, third and fifth embodiments, the microphone holder 2 makes contact with the printed wiring board 4 through the second portion 24. However, it should be noted that the microphone holder 2 may be sandwiched between the first inner surface 31 and a second inner surface 31A of the main case 3 facing the first inner surface 31. Specifically, the microphone holder 2 may be designed to make contact with the first inner surface 31 through the first portion 23, and further with the second inner surface 31A through the second portion 24.

In the above-mentioned first, second, third and fifth embodiments, the part with which the microphone holder 2 makes contact through the second portion 24 is comprised of the printed wiring board 4. However, the part may be comprised of any part other than the printed wiring board 4.

The microphone 1 may have any shape. The microphone holder 2 is shaped in accordance with a shape of the microphone 1.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2004-359635 filed on Dec. 13, 2004 including specification, claims, drawings and summary is incorporated herein by reference in its entirety.

What is claimed is:

1. A communication device including:
   a microphone;
   a microphone holder having a main body to hold said microphone therein; and
   a case encasing said microphone holder therein,
   wherein said microphone holder has a first portion at which said microphone holder makes contact with a first inner surface of said case, and a second portion at which said microphone holder makes contact with a part of said communication device, said microphone holder being sandwiched between said first inner surface and said part, said microphone holder being composed of an elastic material,
   wherein said first portion of said microphone holder is disposed more outwardly than an outer edge of said microphone in a plane which is in parallel with said first inner surface,
   wherein said first portion is a first rib that projects outwardly from a sidewall of the main body in a plane which is in parallel with said first inner surface, the sidewall extending from the first inner surface to the part,
   wherein said second portion is a second rib that projects from a main body of said microphone holder towards said part, and
   wherein said first portion is a means for preventing a pressure from being transferred to the microphone holder from the case and from said communication device,
   wherein the first rib projects toward an opposite side of a voice opening of the microphone holder.

2. The communication device as set forth in claim 1, wherein said first and second portions of said microphone holder are disposed more outwardly than an outer edge of said microphone in a plane which is in parallel with said first inner surface.

3. The communication device as set forth in claim 1, wherein said first portion of said microphone holder projects out of a main body of said microphone holder along said first inner surface.

4. The communication device as set forth in claim 1, wherein at least one of said first and second portions of said microphone holder is ring-shaped.

5. The communication device as set forth in claim 1, wherein said microphone makes electrical contact with a control board of said communication device through a flexible wire.

6. The communication device as set forth in claim 1, wherein said microphone holder is formed with a voice-opening through which said microphone makes air communication with outside of said case,
   said microphone holder is composed of elastic material at least around said voice-opening, and
   said voice-opening and said elastic material are exposed outside through the opening formed at said case.

7. The communication device as set forth in claim 6, wherein an outer surface of said case and an upper surface of said elastic material are on a level with each other.

8. The communication device as set forth in claim 1, further comprising a cover that surrounds a sidewall of said microphone holder therewith.

9. The communication device as set forth in claim 8, wherein the cover is composed of a material different from that of said microphone holder.

10. The communication device as set forth in claim 1, wherein said communication device has a function of making communication with another device.

11. The communication device as set forth in claim 10, wherein said communication device comprises a mobile phone.

12. The communication device as set forth in claim 1, wherein said microphone is formed integrally with the said part.

13. The communication device as set forth in claim 1, wherein the first inner surface and the part sandwiches the microphone holder in a vertical direction, and the first rib projects in a horizontal direction.

14. The communication device as set forth in claim 1, wherein the second rib projects in a vertical direction.

15. The communication device as set forth in claim 1, wherein the first inner surface has the opening through which a voice can pass to the microphone.

16. A communication device including:
- a microphone;
- a microphone holder holding said microphone therein;
- a case encasing said microphone holder therein; and
- a plate being formed with first opening having an inner edge disposed more outwardly than an outer edge of said microphone,
- wherein said microphone holder has a first portion at which said microphone holder makes contact with a first inner surface of said case, and a second portion at which said microphone holder makes contact with the plate, said microphone holder being sandwiched between said first inner surface and the plate, said microphone holder being composed of an elastic material,
- wherein the first inner surface has a second opening through which a voice can pass to the microphone,
- wherein a bottom of said microphone holder makes contact with said inner edge of said plate with the first opening to thereby cause said second portion corresponding to said bottom of said microphone holder to make contact with the plate,
- wherein the case has the second opening of the first inner surface through which the voice can pass to the microphone,
- wherein the plate is disposed more backwardly than the bottom of the microphone holder,
- wherein the outer edge of the microphone holder is disposed more outwardly than the inner edge of the first opening, and
- wherein the first inner surface and the plate sandwich the microphone holder in a direction perpendicular to the first inner surface.

17. The communication device as set forth in claim 16, wherein said plate comprises a printed wiring board.

18. A communication device including:
- a microphone;
- a microphone holder having a main body to hold said microphone therein; and
- a case encasing said microphone holder therein,
- wherein said microphone holder is formed with a voice-opening through which said microphone makes air communication with outside of said case,
- wherein said microphone holder has a first portion at which said microphone holder makes contact with a first inner surface of said case, and a second portion at which said microphone holder makes contact with a part of said communication device, said microphone holder being sandwiched between said first inner surface and said part, and a third portion that projects inwardly from the main body towards a center of the microphone holder, said microphone holder being composed of an elastic material,
- wherein the voice-opening is formed at the first inner surface side of the main body, and
- wherein said first portion projects from the main body toward the said first inner surface in order to form a gap between the main body and the first inner surface at an inner edge of the voice-opening, and said third portion is disposed between the microphone and the first surface of the case and said gap extends from the third portion to the first inner surface of said case.

19. The communication device as set forth in claim 18, further comprising a cover that surrounds a sidewall of said microphone holder therewith.

20. The communication device as set forth in claim 19, wherein the cover is composed of a material different from that of said microphone holder.

21. The communication device as set forth in claim 18, wherein said communication device has a function of making communication with another device.

22. The communication device as set forth in claim 21, wherein said communication device comprises a mobile phone.

23. The communication device as set forth in claim 18, wherein the first inner surface and the part sandwich the microphone holder in a vertical direction,
- wherein the first rib projects in the vertical direction, and
- wherein the second rib projects in the vertical direction.

24. A microphone holder encased in a case for holding a microphone therein, the microphone holder comprising;
- a main body having a room to hold the microphone and a voice-opening through which said microphone makes air communication with outside of said case; and
- a first portion at which said microphone holder makes contact with a first inner surface of said case which has an opening, and a second portion at which said microphone holder makes contact with a part of a communication device, said microphone holder being sandwiched between said first inner surface and said part,
- wherein said microphone holder being composed of an elastic material, and
- wherein the first portion is a first rib that projects outwardly from a sidewall of the main body in a plane which is in parallel with said first inner surface, the sidewall extending from the first inner surface toward the part, and
- wherein said second portion is a second rib that projects from a main body of said microphone holder towards said part,
- wherein the first rib projects toward an opposite side of the voice opening of the microphone holder.

25. The microphone holder as set forth in claim 24, wherein said first and second portions are disposed more outwardly than an outer edge of said microphone in a plane which is in parallel with said first inner surface.

26. The microphone holder as set forth in claim 24, wherein said first portion projects out of a main body of said microphone holder along said first inner surface.

27. The microphone holder as set forth in claim 24, wherein said voice-opening and said elastic material are exposed outside through the opening formed at said case.

28. The microphone holder as set forth in claim 27, wherein an upper surface of said elastic material is on a level with an outer surface of said case.

29. The microphone holder as set forth in claim 24, wherein the first inner surface and the part sandwich the microphone holder in a vertical direction, and the first rib projects in a horizontal direction.

30. The microphone holder as set forth in claim 24, wherein the second rib projects in a vertical direction.

31. A method of fabricating a communication device including a microphone, a microphone holder holding said microphone therein, and a case encasing said microphone holder therein,
- said microphone holder having a main body which holds the microphone, a first portion at which said microphone holder makes contact with a first inner surface of said case, and a second portion at which said microphone holder makes contact with a part of said communication device, said microphone holder being sandwiched between said first inner surface and said part, said microphone holder being composed of an elastic material, the first portion being a first rib that projects outwardly from a sidewall of the main body in a plane which is in parallel with said first inner surface, the sidewall extending from the first inner surface to the part, and said first of said microphone holder is disposed more outwardly than an outer edge of said microphone in a plane which is in parallel with said first inner surface, said second portion is a second rib that projects from a main body of said microphone holder towards said part, wherein said first portion is a means for preventing a pressure from being transferred to the microphone holder from the case and from said communication device, said method comprising:

holding said microphone in said microphone holder; and encasing said microphone holder in said case such that said first portion makes contact with a first inner surface of said case, and said second portion makes contact with said part, wherein the first rib projects toward an opposite side of a voice opening of the microphone holder.

32. The method as set forth in claim 31, wherein the first inner surface and the part sandwich the microphone holder in a vertical direction, and the first rib projects in a horizontal direction.

33. The method as set forth in claim 31, wherein the second rib projects in a vertical direction.

34. The method as set forth in claim 31, wherein the first inner surface has the opening through which a voice can pass to the microphone.

* * * * *